(No Model.)
M. C. GILBERT.
MOTOR.
No. 517,856. Patented Apr. 10, 1894.
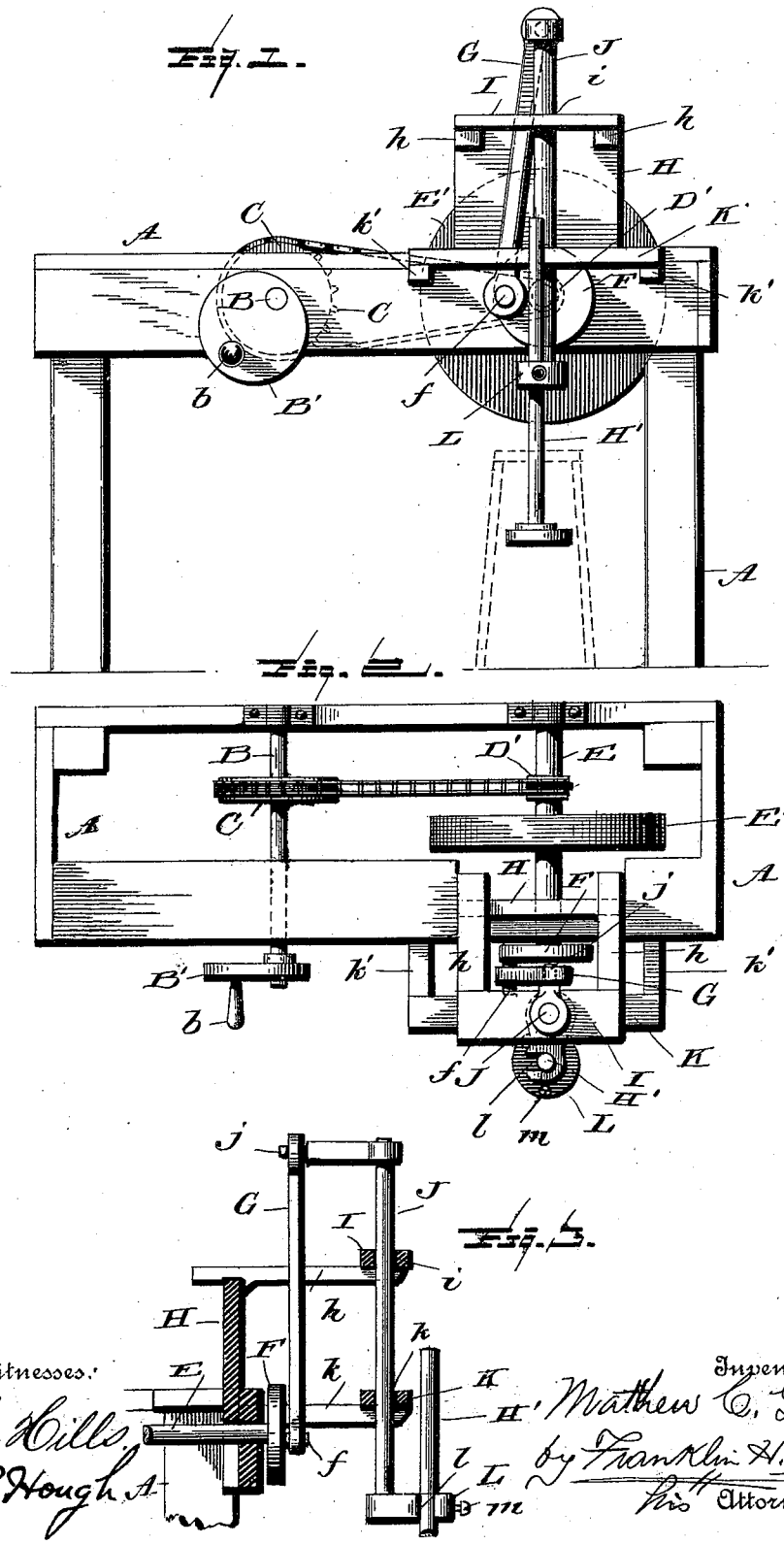
Witnesses:
L. C. Hills
A. L. Hough
Inventor:
Mathew C. Gilbert,
by Franklin H. Hough
his Attorney

UNITED STATES PATENT OFFICE.

MATTHEW C. GILBERT, OF COLUMBUS, GEORGIA.

MOTOR.

SPECIFICATION forming part of Letters Patent No. 517,856, dated April 10, 1894.

Application filed August 22, 1893. Serial No. 483,723. (No model.)

*To all whom it may concern:*

Be it known that I, MATTHEW C. GILBERT, a citizen of the United States, residing at Columbus, in the county of Muscogee and State of Georgia, have invented certain new and useful Improvements in Churn-Motors; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in motors, designed primarily for operating churns, and it has for its objects among others to provide a simple, cheap and durable yet efficient motor which can be readily applied to any churn dasher shaft or stem, easily operated and not liable to get out of order. I provide a shaft having a crank disk and crank pin which is operated by suitable means and to the crank pin there is detachably connected a link or rod which is connected with a lateral portion or projection on a vertical shaft which has provision for ready attachment to the stem or shaft of the dasher.

Other objects and advantages of the invention will hereinafter appear and the novel features thereof will be specifically defined by the appended claim.

The invention in this instance resides in the peculiar combinations, and the construction, arrangement and adaptation of parts, all as more fully hereinafter described, shown in the drawings and then particularly pointed out in the claim.

The invention is clearly illustrated in the accompanying drawings, which, with the letters of reference marked thereon, form a part of this specification, and in which—

Figure 1 is an elevation of my improvement with the dasher stem shown in operative position. Fig. 2 is a plan view thereof. Fig. 3 is a vertical cross section through the crank shaft with parts in elevation.

Like letters of reference indicate like parts throughout the several views.

Referring now to the details of the drawings by letter, A designates a suitable frame upon or from which the operating parts are supported. Journaled in suitable bearings in this frame or support is the transverse horizontal shaft B one end of which is extended and has secured thereto the crank disk B' which is provided with a crank handle or other convenient device b whereby the same may be rotated. This shaft carries a small sprocket wheel C which is located between the side bars of the frame or support as shown, and D is a sprocket chain which passes around this sprocket wheel and around a smaller sprocket wheel D' on the shaft E which is journaled in suitable bearings in the frame and one end of which is extended beyond the side of the frame and carries a crank disk F which is provided with a crank pin f as shown. This shaft may also carry a fly wheel E' as seen in Fig. 2 if desired.

G is a link, rod or pitman connected with the crank pin of this disk and this connection may be such as to permit of ready detachment thereof when desired.

H is an upright rising from the side bar of the frame and to the upper end thereof are secured the horizontal arms h the outer ends of which are connected by the plate or piece I which is provided with an opening i through which the vertical shaft or rod J is designed to slide freely. To the upper end of this rod there is fast a lateral projection or pin j to which the other end of the link or rod G is connected in any suitable manner, preferably detachably. This vertical rod J also passes loosely through an opening k in a horizontal plate or piece K which is supported upon the lateral pieces k' from the side bar of the frame as shown.

The lower end of the rod or shaft J carries the horizontal clamp arm L which has an opening or notch l open upon one side to receive the dasher shaft or stem H' which is detachably held therein in any suitable manner, as for instance by a set screw m as shown, which is held in the arm and is made to engage the shaft or stem to hold it thereto.

The operation will be readily understood from the foregoing description when taken in connection with the annexed drawings, and a further detailed description thereof is not deemed necessary. The dasher shaft or stem can be easily and quickly secured to the clamp arm or released therefrom and the length of stroke can be readily regulated.

What I claim as new is—

The combination with the frame, of the horizontal shaft, the sprocket wheel and crank disk thereon, the shaft parallel with said shaft, the fly wheel and sprocket wheel thereon, the sprocket chain passed around said sprocket wheels, the crank disk and pin the vertical pitman connected at one end to said pin, the upright H rising from the frame, the horizontal arms $h$, the plate I connecting the outer ends of said arms and having an opening, the vertical rod passed loosely through said opening, a lateral projection at the upper end of said rod, and connected to the upper end of the pitman, the lateral pieces $k'$ on the frame, the plate K supported thereon and having an opening through which the vertical rod loosely passes, the clamp arm on the lower end of said rod and having open sided opening, and a set screw for holding the dasher stem therein, all substantially as shown and described.

In testimony whereof I affix my signature in presence of two witnesses.

MATTHEW C. GILBERT.

Witnesses:
S. E. LAWHON,
A. E. THORNTON.